United States Patent Office 3,129,954
Patented Apr. 21, 1964

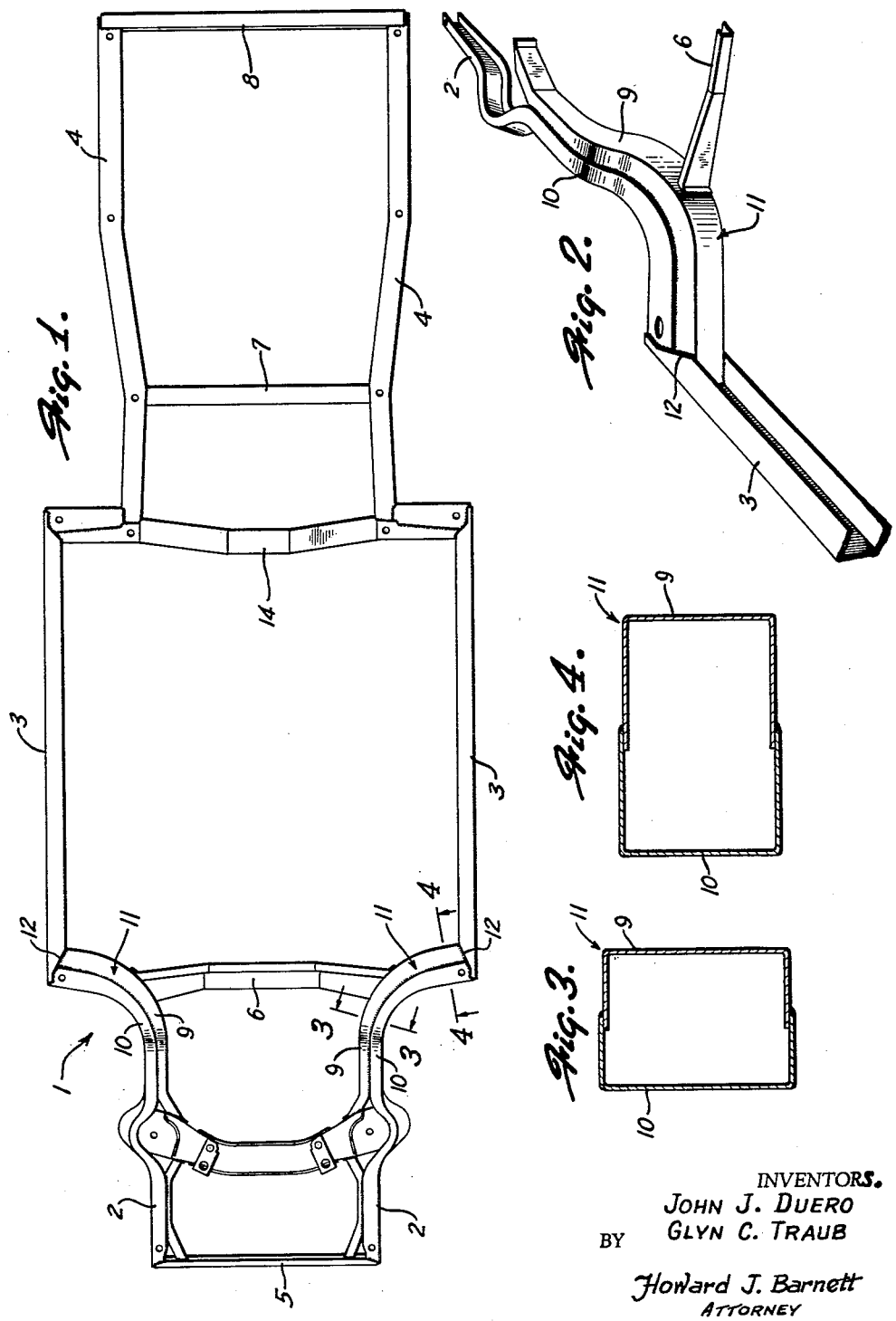

3,129,954
WIDE-HIPPED FRAME HAVING INTEGRAL
TORQUE BOX
John J. Duero, Milwaukee, and Glyn C. Traub, Hartford,
Wis., assignors to A. O. Smith Corporation, Milwaukee,
Wis., a corporation of New York
Filed Sept. 12, 1962, Ser. No. 223,087
2 Claims. (Cl. 280—106)

The present invention is directed to a wide-hipped vehicle frame, and more particularly to a wide-hipped frame having an integral, curved torque box comprising two curved channel members which define an integral, curved box section of superior torsional rigidity. The curved torque box is disposed below the dash area of the vehicle, just aft the front wheels, at the area where this type of frame is subjected to the greatest torsional strain.

Wide-hipped frames have been widely used to make possible the lower silhouette developed for frame-type passenger vehicles. This type of frame makes it possible to lower the overall vehicle height up to eight inches. The general means of accomplishing this is to provide a wide intermediate portion, on which the passenger section of the vehicle is dropped, so that the floor of the passenger compartment is substantially level with the bottom surface of the outer middle side rails of the frame. Lowering of the vehicle also lowers the center of gravity, providing a dynamically more stable vehicle and added insurance against upset.

Until now, the wide-hipped vehicle frame generally comprised five or six major components. These components are usually described as front inner side rails, front torque boxes, outer middle side rails, rear torque boxes, rear inner side rails, and a plurality of cross bars. The cross bars are disposed transversely along the frame, and interconnect the pairs of front, middle and rear side rails into an integral frame unit. The front and rear sections of the frame are narrow to accommodate the vehicle wheels. The front and rear torque boxes extend transversely to connect the front and rear sections to the middle section, at the front and rear ends of the outer middle side rails, respectively.

It has been proposed that a wide-hipped frame be made having a continuous curved side rail throughout the length of the vehicle. However, the torque box portions of the frame are subjected to severe torsional stresses, and a continuous side rail frame has not thus far proved feasible with present forming methods because it is extremely difficult to economically provide sufficient strength in the torque box portion and also form the severe lateral offset required to clear the front wheels and front toe board of the vehicle.

This invention, however, does provide an economically feasible torque box construction which comprises an integral, outwardly curving extension of the front and rear inner side rails, respectively.

This torque box also is formed to curve downwardly, as it extends outwardly, to attach to the outer middle side rail at the inner edge thereof. The cross sectional dimension increases progressively towards the end of the torque box which is attached to the outer middle side rail. This feature is extremely important, because the metal from which the integral curved torque box is formed is of constant thickness, and it is necessary to progressively increase the cross sectional area of the torque box to obtain a progressively increasing torsional rigidity corresponding directly to the increasing torsional stresses as the orientation of the member becomes transverse relative to the fore and aft axis of the frame.

The present invention provides a wide-hipped frame which comprises less components than the conventional wide-hipped frame. This frame replaces the three-part torque box of the older frame designs with a more basically simple two-piece torque box which is as strong as a conventional torque box, and requires less welding.

In the present invention, the front section inner side rails are continuous and integral with the torque boxes, and the frame is therefore more economical to manufacture, while sacrificing nothing in overall frame rigidity.

The drawings illustrate the best mode presently contemplated of carrying out the invention.

In the drawings:

FIGURE 1 is a top plan view of an offset frame embodying the invention;

FIG. 2 is an enlarged fragmentary perspective view showing the integral construction of the torque box and the manner in which the torque box is secured to the side rail;

FIG. 3 is a section along lines 3—3 of FIG. 1;

FIG. 4 is a section along lines 4—4 of FIG. 1 showing the changing dimension of the torque box.

The wide-hipped frame 1 of this invention includes a pair of front inner side rails 2 defining a narrow front portion, a pair of outer middle side rails 3 forming a middle wide portion, and a pair of rear inner side rails 4 comprising a rear narrow portion. The front inner side rails 2 are rigidly secured together by means of front cross bars 5 and 6. The rear inner side rails 4 are similarly united by means of rear cross bars 7 and 8. The outer middle side rail 3 can be either a channel section, or a box section. The rear inner side rails 4 are shown as a downwardly opening hat section. This also could be either a channel or box section member.

The front inner side rails 2, however, are shown as a box section, because, in most applications, the strength required at the front torque box region of the wide-hipped frame necessitates a more rigid element than could be provided by a channel section. For this reason, the front inner side rails 2 each comprise a pair of curved channel members 9 and 10, disposed together to form a box section member having a gradually increasing cross section proceeding rearwardly of the vehicle. As the side rail 2 extends rearwardly, it abruptly increases its outward curvature to define an integral curving torque box 11. Each torque box 11 is joined to its respective outer middle side rail by means of welds 12. The rear torque boxes 13 are shown as non-integral, conventional box section members, largely because the rear side rails 4 are hat section members, and were not joined together to form a box section, such as is required in the torque box.

As can best be seen in FIGURE 1, the front torque boxes 11 are continuous with the front inner side rails 2, and for this reason are much more readily manufactured with a consequent reduction in labor cost. The invention combines torque box 11 and the front inner side rail 2 to reduce the number of pieces required, and yet the advantages of the wide-hipped frame are retained.

The present invention provides an improved wide-hipped vehicle frame having an integral combination front inner side rail and torque box which is a smooth, structurally stiff and continuous transition member connecting the inwardly disposed front inner side rail portion of the vehicle frame to the outwardly disposed middle side rails. The frame of this invention is more readily manufactured because of the integral curving torque box construction.

Various modes of carrying out the invention are contemplated as being within the scope of the following claims particularly pointing out and distinctly claiming the subject matter which is regarded as the invention.

We claim:

1. A wide-hipped vehicle frame for use in a vehicle having front and rear wheels and having a passenger floor level generally coinciding with the lowest portion of the frame, said frame having a front narrow portion, a wide intermediate portion having a front end immediately adjacent said front narrow portion, and a narrow rear portion, said front narrow portion including a pair of tubular front inner side rails, and a pair of front torque boxes comprising continuous, outwardly curving extensions of said tubular front inner side rails, said torque boxes progressively increasing in horizontal cross sectional dimension while simultaneously decreasing in vertical cross sectional dimension while curving abruptly outwardly on a line extending transversely of said frame through the front end of the wide intermediate portion of the frame, said torque boxes connecting the front narrow portion to the wide intermediate portion of the vehicle frame, whereby said torque boxes provide clearance between the frame, the dash area of the vehicle, and the adjacent wheels of the vehicle.

2. In a wide-hipped vehicle frame having narrow end portions and a generally central wide portion offset outwardly therefrom, said wide portion including a pair of laterally spaced, generally parallel outer middle side rails, one of said narrow portions including a pair of laterally spaced, generally parallel tubular inner side rails, a pair of laterally spaced torque boxes disposed adjacent one end of the wide portion of the frame and connecting said tubular inner side rails and the outer middle side rails of the frame together, said torque boxes comprising integral extensions of said tubular inner side rails and extending transversely outwardly from said inner side rails at a line extending substantially between the corresponding ends of the outer middle side rails, said torque boxes and said inner side rails being provided from metal having a substantially constant thickness throughout, said torque box extensions progressively increasing in horizontal cross sectional dimension while simultaneously decreasing in vertical cross sectional dimension while proceeding generally transversely outwardly towards the adjacent end of the respective outer middle side rail.

References Cited in the file of this patent

UNITED STATES PATENTS

| | | |
|---|---|---|
| 1,754,926 | Andrew | Apr. 15, 1930 |
| 2,173,525 | Wallace | Sept. 19, 1939 |
| 2,746,763 | Nallinger | May 22, 1956 |
| 2,809,050 | Bauer | Oct. 8, 1957 |
| 2,918,982 | Vlachos | Dec. 29, 1959 |
| 2,935,335 | Muller | May 3, 1960 |
| 3,105,701 | Schilberg | Oct. 1, 1963 |